(12) United States Patent
Hopka et al.

(10) Patent No.: US 9,115,629 B2
(45) Date of Patent: Aug. 25, 2015

(54) METHOD FOR DIAGNOSING OPERATION OF A PARTICULATE MATTER SENSOR

(71) Applicant: Ford Global Technologies, LLC, Dearborn, MI (US)

(72) Inventors: Michael Hopka, Millford, MI (US); Michiel J. Van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 151 days.

(21) Appl. No.: 13/909,907

(22) Filed: Jun. 4, 2013

(65) Prior Publication Data

US 2013/0263578 A1    Oct. 10, 2013

Related U.S. Application Data

(62) Division of application No. 13/042,726, filed on Mar. 8, 2011, now Pat. No. 8,490,476.

(51) Int. Cl.
| | |
|---|---|
| *F01N 11/00* | (2006.01) |
| *F02D 41/14* | (2006.01) |
| *F02D 41/22* | (2006.01) |
| *F01N 3/20* | (2006.01) |

(52) U.S. Cl.
CPC ............ *F01N 11/00* (2013.01); *F02D 41/1466* (2013.01); *F02D 41/222* (2013.01); *F01N 3/2066* (2013.01); *F01N 2560/05* (2013.01); *F01N 2590/11* (2013.01); *F01N 2610/02* (2013.01); *Y02T 10/40* (2013.01)

(58) Field of Classification Search
CPC . F01N 11/00; F01N 2550/00; F01N 2550/04; F01N 2550/05; F01N 2550/14; F01N 2560/05; F01N 2560/12
USPC .......................................... 73/114.69, 114.75
See application file for complete search history.

(56) References Cited

U.S. PATENT DOCUMENTS

| | | | |
|---|---|---|---|
| 6,304,813 | B1 | 10/2001 | Ikeda et al. |
| 7,278,304 | B2 * | 10/2007 | Zanini-Fisher et al. ... 73/114.71 |
| 7,340,889 | B2 * | 3/2008 | Riquelme ........................ 60/310 |
| 7,389,773 | B2 | 6/2008 | Stewart et al. |
| 7,526,914 | B2 | 5/2009 | Nakano |
| 7,765,792 | B2 | 8/2010 | Rhodes et al. |
| 7,832,200 | B2 | 11/2010 | Kesse et al. |
| 8,370,017 | B2 * | 2/2013 | Weber et al. ................. 701/29.1 |

(Continued)

FOREIGN PATENT DOCUMENTS

JP    2009144512 A    7/2009

OTHER PUBLICATIONS

"Applicants Statement of Related Art Known to Others", Statement as of Aug. 27, 2009, 1 Pg.

(Continued)

*Primary Examiner* — Eric S McCall
(74) *Attorney, Agent, or Firm* — Julia Voutyras; Alleman Hall McCoy Russell & Tuttle LLP

(57) ABSTRACT

A method for diagnosing a particulate matter sensor is described. In one example, a liquid is purposefully injected into the exhaust system to verify operation of the particulate matter sensor. Reliability of particulate matter diagnostics may be improved by way of the approach, at least during some conditions.

14 Claims, 4 Drawing Sheets

(56) References Cited

U.S. PATENT DOCUMENTS

| | | | | |
|---|---|---|---|---|
| 8,438,899 | B2* | 5/2013 | Zawacki et al. | 73/1.06 |
| 8,448,511 | B2* | 5/2013 | Zawacki et al. | 73/335.05 |
| 2001/0035044 | A1 | 11/2001 | Larsson et al. | |
| 2008/0087005 | A1 | 4/2008 | Wahl et al. | |
| 2008/0184774 | A1 | 8/2008 | Aoki | |
| 2010/0132341 | A1 | 6/2010 | Stefanick et al. | |
| 2010/0223912 | A1 | 9/2010 | Larose, Jr. et al. | |
| 2010/0313547 | A1 | 12/2010 | Gonze et al. | |
| 2011/0010035 | A1* | 1/2011 | Weber et al. | 701/29 |
| 2011/0011067 | A1 | 1/2011 | Ren et al. | |
| 2011/0047978 | A1 | 3/2011 | Zawacki et al. | |
| 2011/0047985 | A1 | 3/2011 | Zawacki et al. | |
| 2011/0048106 | A1 | 3/2011 | Zawacki et al. | |
| 2013/0255353 | A1* | 10/2013 | Zawacki et al. | 73/1.06 |

OTHER PUBLICATIONS

Zawacki, Garry et al., "System for an Engine Having a Particulate Sensor," U.S. Appl. No. 61/239,381, Filed Sep. 2, 2009, 33 pages.

* cited by examiner

METHOD FOR DIAGNOSING OPERATION OF A PARTICULATE MATTER SENSOR

CROSS REFERENCE TO RELATED APPLICATIONS

The present application is a divisional of U.S. patent application Ser. No. 13/042,726 filed Mar. 8, 2011, the entire contents of which are incorporated herein by reference for all purposes.

BACKGROUND/SUMMARY

Particulate matter may form in vehicle exhaust when less than complete combustion of an air-fuel mixture occurs within an internal combustion engine. In some examples, the particulate matter may be trapped in a filter for oxidation at a later time so that the particulate matter may be converted to $CO_2$. However, the particulate filter trapping efficiency may degrade over time. One way to determine whether or not the efficiency of a particulate filter has degraded is to compare the amount of particulate matter entering the particulate filter against the amount of particulate matter exiting the particulate filter. Particulate matter sensors can provide an indication of the amount of particulate matter entering and exiting the particulate filter when particulate sensors are positioned upstream and downstream of the particulate filter in a direction of exhaust flow. However, it may be desirable to verify operation of the particulate matter sensors to ensure that the particulate filter efficiency as determined from the particulate matter sensors is reliable. Verifying operation of the downstream particulate sensor may be particularly difficult because the particulate filter tends to hold exhaust constitutents.

The inventors herein have recognized the above-mentioned disadvantages and have developed a method for verifying operation of particulate matter sensors. In one example, a method for diagnosing a particulate matter sensor comprises: injecting a liquid into an exhaust system before a dewpoint temperature in the exhaust system is exceeded; and depositing at least some of the liquid on the particulate matter sensor.

By injecting liquid (e.g., urea) into the exhaust system it is possible to saturate a particulate filter, SCR, and/or catalyst with the liquid so that at least a portion of the injected liquid deposits on the particulate matter sensor so that operation of the particulate matter sensor may be verified. Operation of the particulate sensor may be verified if the conductivity of the particulate matter sensor changes (e.g., increases) in the presence of the liquid. Otherwise, if the conductivity of the particulate matter sensor changes by less than a predetermined amount, it may be determined that the particulate matter sensor is degraded. Thus, liquid may be injected into the exhaust system to the extent that the storage capacity of exhaust system components is exceeded such that there may be a higher possibility of depositing liquid on the particulate matter sensor, thereby improving the reliability of the diagnostic method.

The present description may provide several advantages. Specifically, the approach provides a way to diagnose operation of a particulate matter sensor even when the particulate matter sensor is located downstream of a device that holds exhaust constituents. Further, the approach provides an active way for diagnosing operation of a particulate matter sensor. For example, the method provides for outputting a signal in the form of a liquid that can directly stimulate the output of the particulate matter sensor. Further still, in one example, the approach can conserve liquid injected into the exhaust system by first attempting to diagnose the particulate matter sensor with liquid that may already be in the exhaust system. Injection of the liquid external to the exhaust system may commence only after conductivity of the particulate matter sensor fails to change by a predetermined amount in response to any liquid that may be within the exhaust system.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
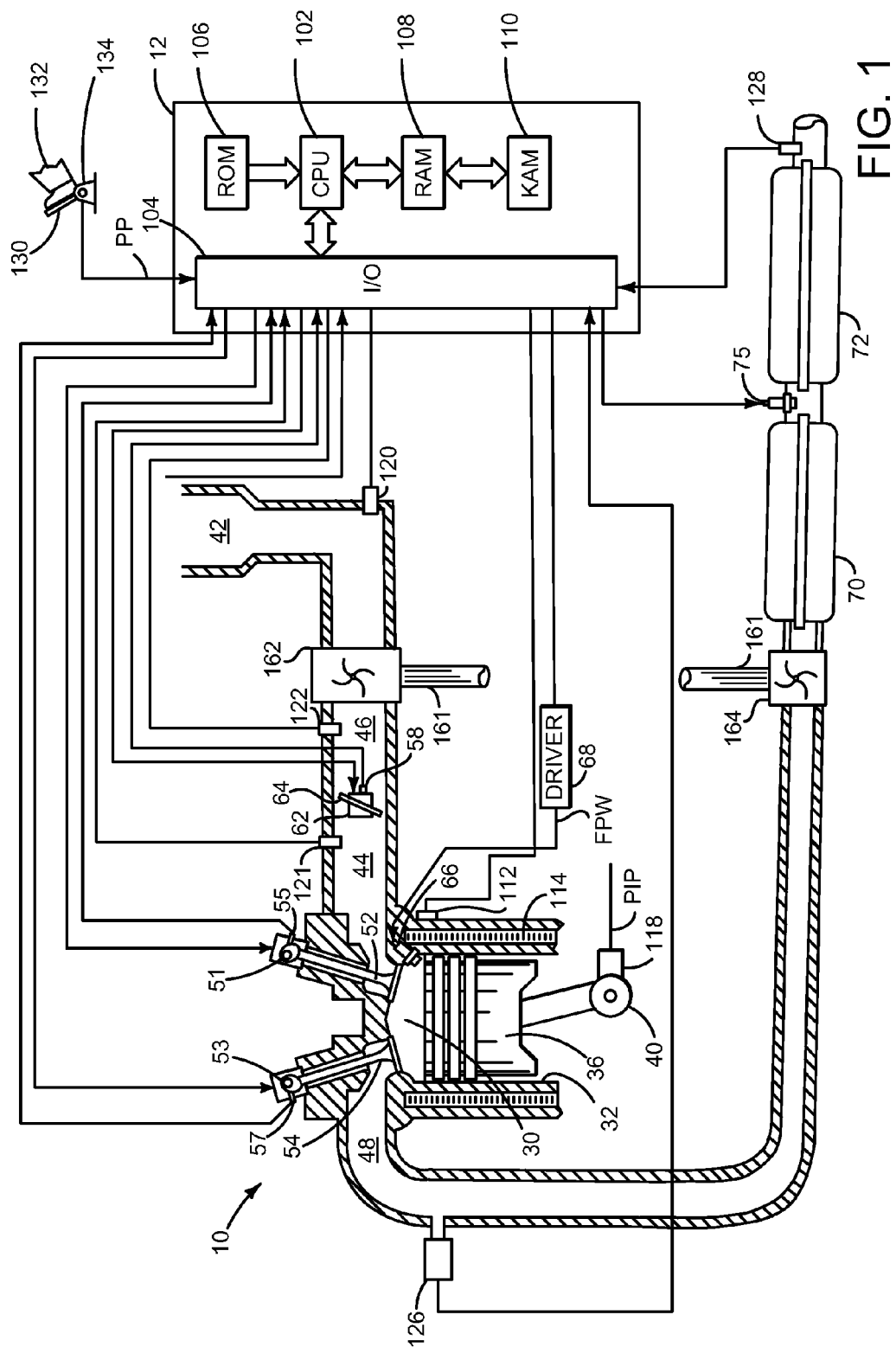
FIG. 1 shows a schematic depiction of an engine.
Figure 2:
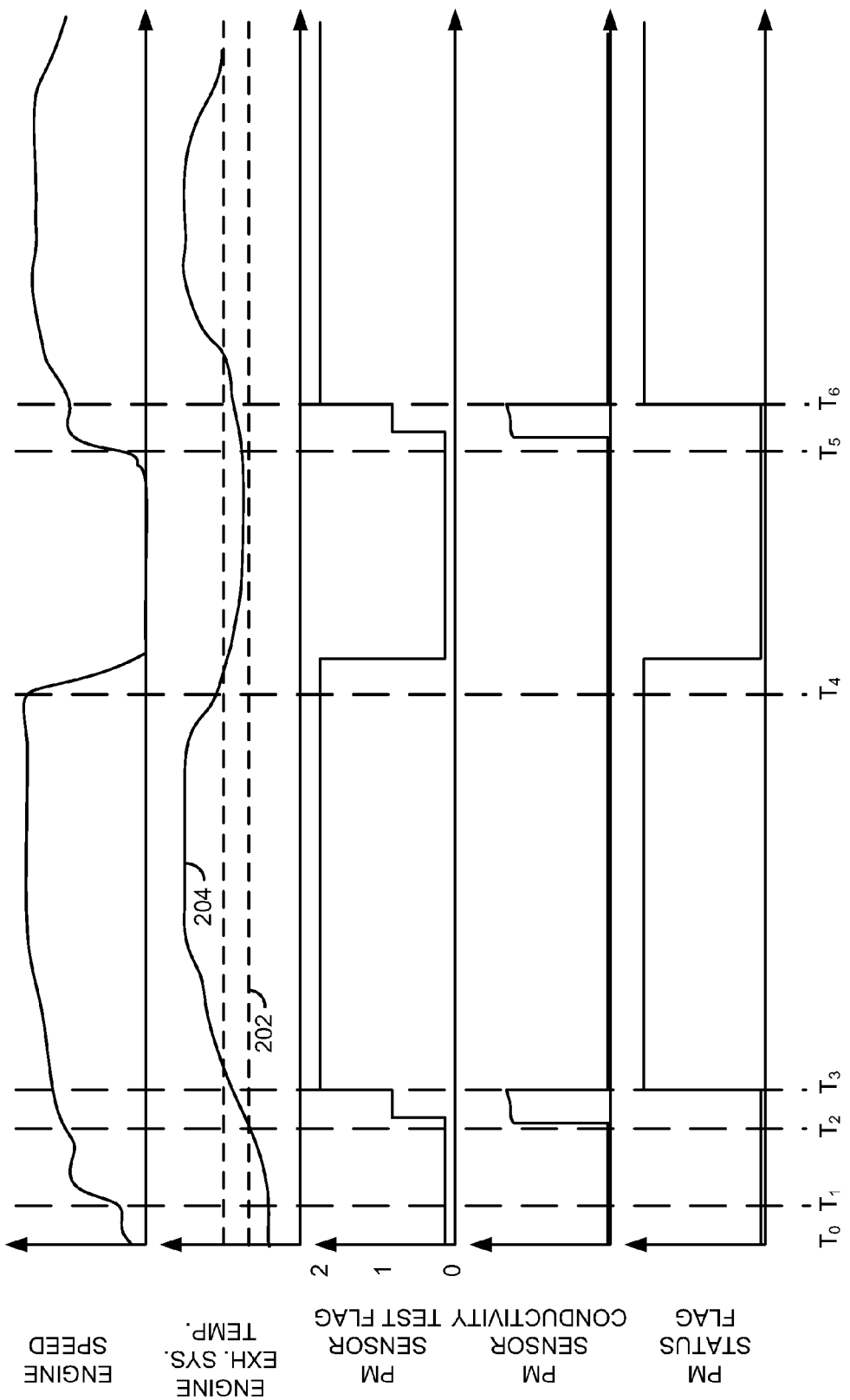
FIG. 2 shows prophetic example data for diagnosing a particulate matter sensor.
Figure 3:
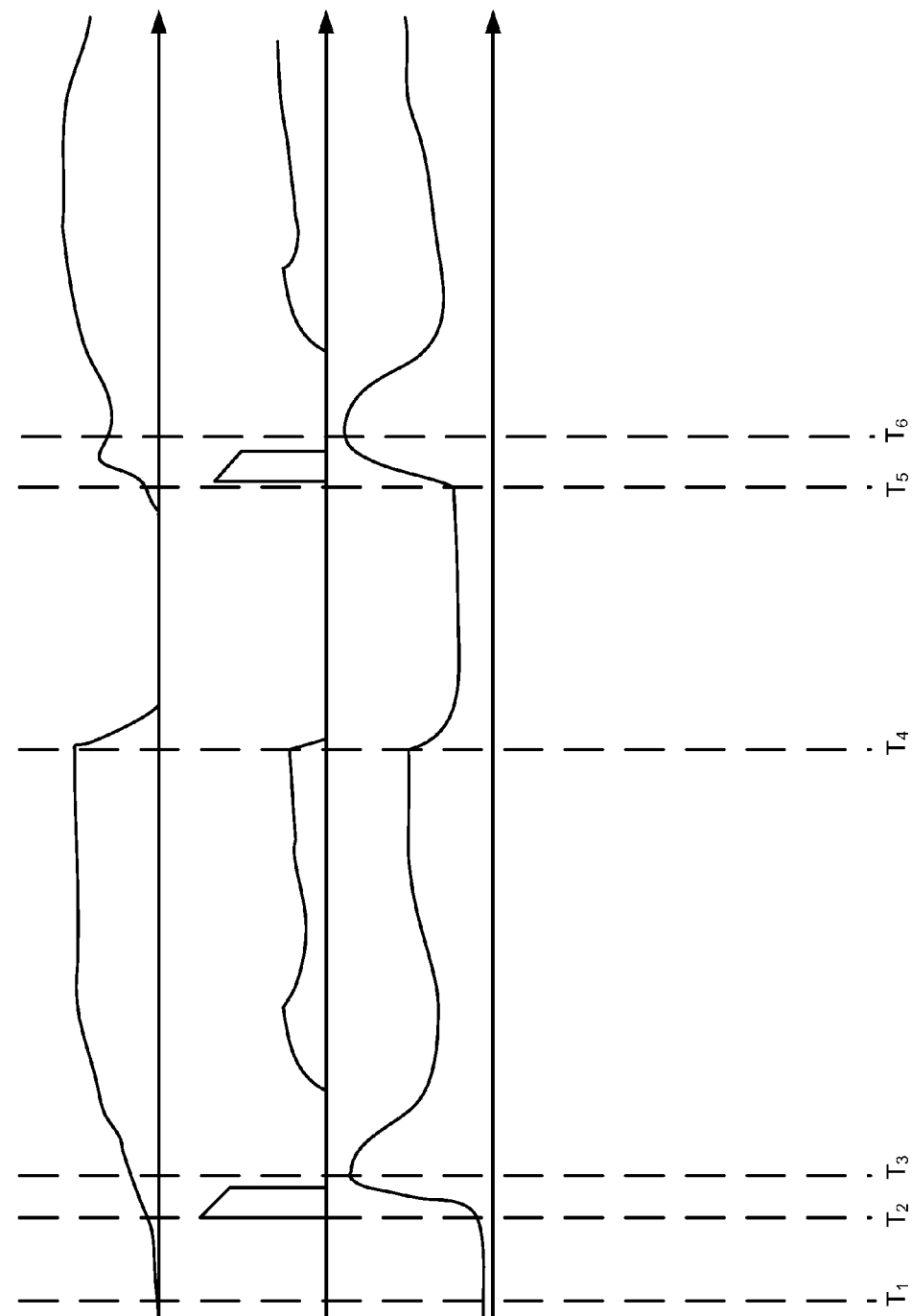
FIG. 3 shows additional example data for diagnosing a particulate matter sensor.

The present description is related to diagnosing operation of a particulate matter sensor. In one aspect of the description, a liquid may be injected into an exhaust system to determine whether or an output of the particulate matter sensor will change in response to the injected liquid. FIG. 1 shows an example engine system for diagnosing operation of a particulate filter. FIG. 2 shows an example particulate matter diagnosing sequence. FIG. 3 shows a flowchart of an example method for diagnosing operation of a particulate matter sensor.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Fuel injector 66 delivers liquid fuel in proportion to the pulse width of signal FPW from controller 12. Fuel is delivered to fuel injector 66 by a fuel system (not shown) including a fuel tank, fuel pump, fuel rail (not shown). Fuel pressure delivered by the fuel system may be adjusted by varying a position valve regulating flow to a fuel pump (not shown). In addition, a metering valve may be located in or near the fuel rail for closed loop fuel control. Fuel injector 66 is supplied operating current from driver 68 which responds to controller 12.

Intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162 via shaft 161.

Combustion is initiated in combustion chamber 30 when fuel automatically ignites as piston approaches top-dead-center compression stroke. In some examples, a universal Exhaust Gas Oxygen (UEGO) sensor (not shown) may be coupled to exhaust manifold 48 upstream of emissions device 70 in the vicinity of particulate matter sensor 126. In other examples, particulate sensor 126 may be omitted and an oxygen sensor provided in its place. In still other examples, a second UEGO sensor may be located downstream of one or more exhaust after treatment devices. In the present example, a second particulate matter sensor 128 is provided downstream of an emissions control device 72 and a liquid injector 75 is provided between emissions devices 70 and 72. In some examples, liquid injector 75 may be positioned upstream of emissions devices 70 and 72. In one example, liquid injector 75 injects liquid urea or $NH_3$.

Emissions device 70 is shown positioned in the engine exhaust system downstream of turbocharger turbine 164. Emissions device 70 can include an oxidation catalyst in one example. Alternatively, emissions device 70 may be configured as a SCR or particulate filter. Particulate matter sensor 128 may be moved to a location between emission device 70 and emission device 72 in some examples. Emissions device 72 is shown located downstream of emissions device 70 in the direction of exhaust flow and may be configured to include a SCR and a particulate filter. In alternative examples, emissions devices 70 and 72 along with particulate sensor 128 may be positioned upstream of turbine 164. In one example, liquid injector 75 provides liquid $NH_3$ supplied via a pump and $NH_3$ storage tank (not shown) to emission device 72. The liquid $NH_3$ is supplied to emission device 72 such that vaporization of $NH_3$ is promoted.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a measure of boost pressure from pressure sensor 122; a measurement of engine manifold pressure (MAP) from pressure sensor 121 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC).

In a process hereinafter referred to as injection, fuel is introduced into the combustion chamber. In some examples, fuel may be injected to a cylinder a plurality of times during a single cylinder cycle. In a process hereinafter referred to as ignition, the injected fuel is ignited by compression ignition or by known ignition means such as spark plug (not shown), resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Referring now to FIGS. 2 and 3, prophetic example data for diagnosing a particulate matter sensor is shown. The example data of FIGS. 2 and 3 are shown at the same timing and during the same sequence. The data is representative for the method described in FIG. 4.

The first plot from the top of FIG. 2 represents engine speed versus time. The Y axis represents engine speed, and engine speed increases in the direction of the Y axis arrow. The X axis represents time, and time increases from the left to the right side of the plot.

The second plot from the top of FIG. 2 represents engine exhaust system temperature versus time. The Y axis represents engine exhaust system temperature, and engine temperature increases in the direction of the Y axis arrow. Engine exhaust system temperature may be at a selected location within the exhaust system (e.g., at the location of the particulate matter sensor). The X axis represents time, and time increases from the left to the right side of the plot. Horizontal lines 202 and 204 represent two selected exhaust temperatures. In particular, line 202 represents freezing temperature for urea and line 202 represents a dewpoint temperature at the particulate sensor.

The third plot from the top of FIG. 2 represents a particulate matter (PM) sensor test flag. The Y axis represents the state of the test flag. A value of zero represents no test in progress, a value of one represents a test is in progress, and a value of two represents particulate matter sensor test complete.

The fourth plot from the top of FIG. 2 represents output conductivity of a particulate matter sensor versus time. The Y axis represents particulate matter sensor output conductivity (e.g., increases as the amount of sensed particulate matter increases), and output conductivity increases in the direction of the Y axis arrow. The X axis represents time, and time increases from the left to the right side of the plot.

The fifth plot from the top of FIG. 2 represents the particulate matter sensor status flag. The Y axis represents particulate matter sensor status flag. A value of one indicates that the particulate matter sensor has passed a diagnostic test. A value of zero indicates that the particulate matter sensor has not passed a diagnostic test. For example, the particulate matter sensor may not have been tested or the sensor may have not passed a diagnostic test. The X axis represents time, and time increases from the left to the right side of the plot.

The first plot from the top of FIG. 3 represents engine feed gas NOx emissions. The Y axis represents the concentration of NOx in engine feed gas entering the exhaust system. The concentration of NOx increases in the direction of the Y axis arrow. The X axis represents time, and time increases from the left to the right side of the plot.

The second plot from the top of FIG. 3 represents the flow rate of $NH_3$ to the exhaust system. The Y axis represents the flow rate of $NH_3$, and the flow rate of $NH_3$ increases in the direction of the Y axis arrow. The X axis represents time, and time increases from the left to the right side of the plot.

The third plot from the top of FIG. 3 represents an amount of $NH_3$ stored within a SCR in an exhaust system, the SCR positioned upstream of the particulate matter sensor being diagnosed. The Y axis represents the mass of $NH_3$ stored within the SCR, and the mass of $NH_3$ increases in the direction of the Y axis arrow. The X axis represents time, and time increases from the left to the right side of the plot.

At time $T_0$, the engine is cranked as part of a cold start (e.g., where the engine has been off for a period of time immediately before $T_0$). The engine exhaust system temperature is below the freezing temperature of urea at 202. The particulate matter sensor test flag is at a level of zero indicating that no particulate matter test is taking place at time $T_0$. The particulate matter sensor output conductivity is low indicating a low level of particulate matter is being detected by the particulate matter sensor and the particulate matter sensor status flag is at zero indicating that the particulate matter sensor has not passed a diagnostic test. The particulate matter sensor diagnostic test is not initiated at time $T_0$ since the exhaust temperature is below a freezing temperature of the urea to be injected to the exhaust system. In other examples, the freezing temperature may be adjusted according to the freezing temperature of the liquid being injected to the exhaust system. For example, if water is injected to the exhaust system, the temperature can be adjusted to near 0° C. The engine feed gas NOx is low since temperatures and pressures in the engine are relatively low during the cold start. $NH_3$ is not initially injected to the exhaust system since the particulate matter diagnostic test has not started and since the feed gas NOx is low. Further, a small amount of $NH_3$ remains stored in the SCR at the time the engine is started.

At time $T_1$, the engine speed accelerates indicating that the engine is started and operating. The exhaust system temperature also begins to increase as gases are expelled from the engine to the exhaust system. The particulate matter sensor test flag, status flag, and sensor output remain low since the exhaust temperature remains below the freezing threshold temperature 202. The NOx feed gas remains low and $NH_3$ is not injected during the initial engine run-up period.

At time $T_2$, engine speed has reached a higher level indicating that the engine continues to operate. The engine exhaust system temperature has also exceeded the freezing temperature at 202. Liquid may be injected to the exhaust system after the exhaust system temperature exceeds freezing temperature. In this example, urea is injected to the exhaust system shortly after the exhaust system temperature exceeds the freezing temperature 202 as indicated by the high $NH_3$ flow rate. The amount of $NH_3$ estimated to be stored within the SCR increases rapidly because of the higher $NH_3$ flow rate.

After a period of time, a portion of the injected urea is deposited on the particulate matter sensor and the conductivity of the particulate matter sensor increases. The particulate matter sensor test flag transitions to a level of one indicating that the output of the particulate sensor is being read. The particulate matter sensor test flag may monitor the output of the particulate matter sensor for a predetermined amount of time that is related to an amount of time that it is expected to take the liquid to pass through a SCR, particulate filter, or other emissions control device. The particulate matter status flag remains at a level of zero indicating that the particulate matter sensor has not passed the diagnostic test at time $T_2$.

At time $T_3$, the particulate matter sensor test flag transitions from a value of one to a value of two indicating that the particulate matter diagnostic test is complete. The flow of $NH_3$ is stopped when the diagnostic test completes. The particulate matter status flag also transitions from a value of zero to a value of one indicating that the particulate matter sensor has passed the diagnostic and is not degraded. The output of the particulate matter sensor reached a higher level between times $T_2$ and $T_3$ indicating that the conductivity of the particulate matter sensor increased in response to the injected urea. Consequently, it may be determined that the particulate matter sensor is not degraded. The output of the particulate matter sensor goes to a low level shortly after time $T_3$ indicating that the liquid once present at the particulate matter sensor has vaporized and is no longer present on the particulate matter sensor. Therefore, the output of the particulate matter sensor reflects the amount of particulate matter present on the particulate matter sensor.

It should also be mentioned that the particulate matter diagnostic test is complete before the engine exhaust temperature reaches the dewpoint temperature at 204. Accordingly, the injection of urea is stopped before the exhaust system temperature reaches the dewpoint. Consequently, the urea may not be vaporized and pass by the particulate sensor without depositing on the particulate sensor.

Between time $T_3$ and $T_4$, the estimated amount of $NH_3$ stored within the SCR decreases as the engine feed gas NOx increases. The flow of $NH_3$ resumes, albeit at a lower flow rate when the estimated amount of $NH_3$ stored within the SCR reaches a predetermined level (e.g. 30% of the available $NH_3$ storage capacity of the SCR). The estimated amount of $NH_3$ stored within the SCR increases and stabilizes at a desired level (e.g. 50% of the available $NH_3$ storage capacity of the SCR).

At time $T_4$, the engine speed is reduced and the engine is brought to a stopped state. The particulate sensor test flag and the particulate matter status flag are reset to zero so that the particulate matter sensor may be retested during a subsequent engine start. Engine starting is an opportunistic time for testing the particulate matter sensor because the exhaust system temperature may be below the dewpoint temperature. Injection of $NH_3$ into the exhaust system is also ceased when the engine is stopped.

Between time $T_4$ and $T_5$, the engine is stopped and the exhaust system cools to a temperature between the freezing temperature 202 and the dewpoint temperature 204. Some of the $NH_3$ estimated to be stored within the SCR may evaporate during the time the engine is stopped. Accordingly, the estimated amount of $NH_3$ stored within the SCR is reduced. The engine is cranked shortly before time $T_5$ when the engine is restarted.

At time $T_5$, the engine speed increases indicating that the engine is restarted. The engine exhaust system temperature also starts to increase and urea is injected at a relatively high rate to the exhaust system so as to pass through the SCR. Urea may be injected soon after start since the exhaust system temperature is greater than freezing temperature 202. Further, since the engine is somewhat warm NOx is produced by the engine as shown by the feed gas NOx. Some of the $NH_3$ injected to diagnose the particulate matter sensor is consumed within the SCR reducing NOx. The output of the particulate matter sensor increases when the liquid urea is deposited on the particulate matter sensor after passing through the SCR. The particulate matter sensor test flag transitions from a value of zero to a value of one indicating that a particulate matter sensor test diagnostic test is underway.

At time $T_6$, the particulate matter sensor test flag transitions from a value of one to a value of two indicating that the diagnostic test is complete. Further, the flow rate of $NH_3$ into the exhaust system is reduced. In this particular example, the NH3 flow rate is reduced to zero, however, lower flow rates of $NH_3$ may be provided in other examples. The particulate matter status flag also transitions from a value of zero to a value of one indicating that the particulate matter sensor has passed the diagnostic test and is not degraded. If the particulate matter sensor where not to pass the diagnostic test and determined to be degraded, the particulate matter status flag would remain at a value of zero.

After time $T_6$, the engine speed varies and the particulate matter sensor test flag and status flag remain set. The test flag and the status flag may remain set at least until the engine is stopped. In some examples, the test flag and status flag may remain set for a predetermined amount of engine operating time or until the vehicle has covered a predetermined number miles. The engine continues to provide feed gas NOx and the $NH_3$ flow rate is increased in response to the estimated amount of $NH_3$ stored in the SCR being below a threshold level. The amount of $NH_3$ store within the SCR stabilizes at a desired level after flow of $NH_3$ resumes.

Figure 4:
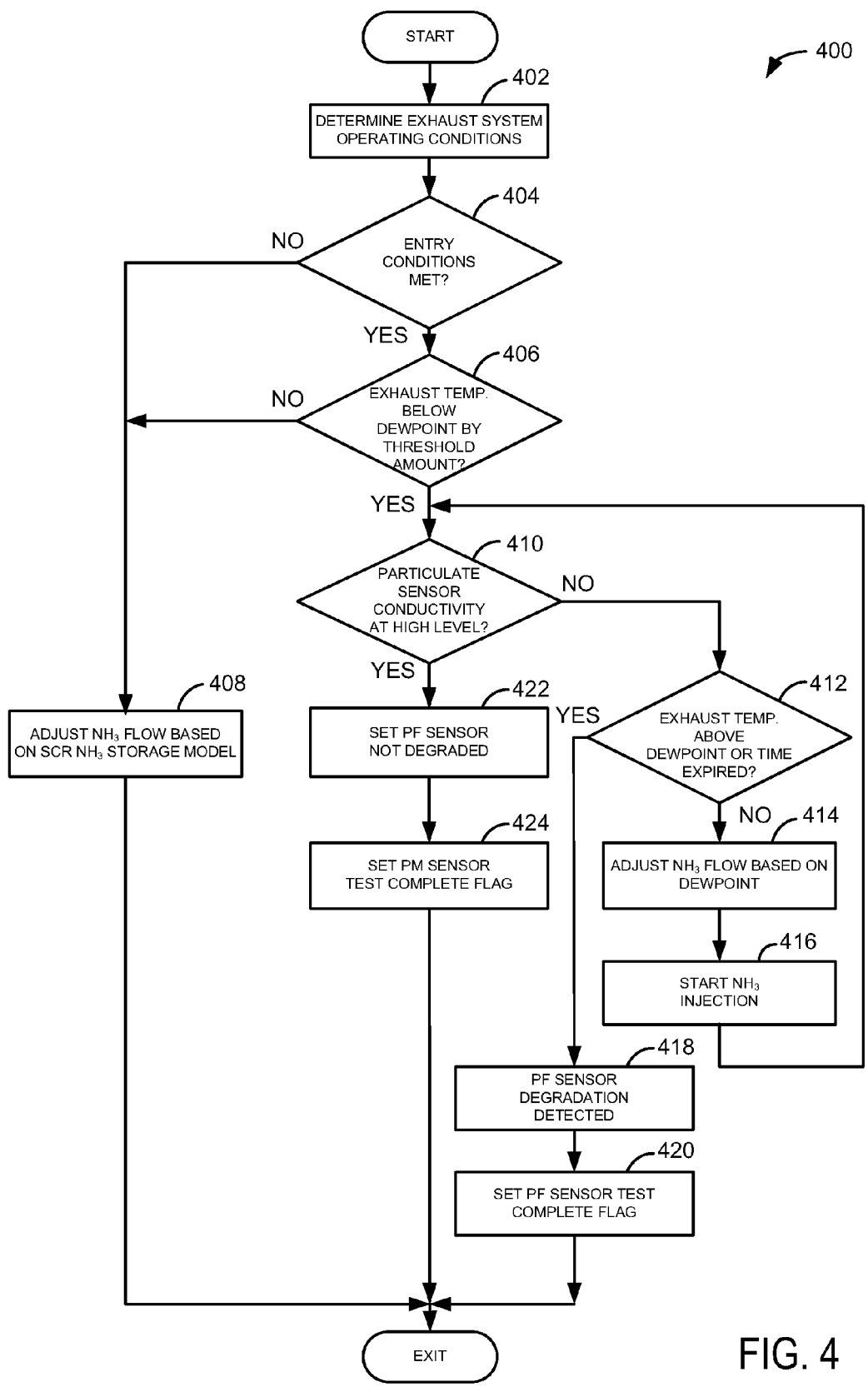
FIG. 4 shows a flowchart for diagnosing operation of a particulate matter sensor.

Referring now to FIG. 4, a flowchart for diagnosing operation of a particulate matter sensor is shown. The method of FIG. 4 is executable by instructions of controller 12 of FIG. 1.

At 402, exhaust system operating conditions are determined. Exhaust system operating conditions may include but are not limited to exhaust temperature, exhaust system dewpoint temperature, engine speed, engine load, time since engine stop, exhaust flow rate, estimated amount of $NH_3$ stored within a SCR or other emission control device positioned in the engine exhaust system, and exhaust system configuration (e.g., exhaust sensor and emission device locations). In one example, the amount of $NH_3$ stored within a SCR is based on an empirically determined model. Method 400 proceeds to 404 after engine exhaust system operating conditions are determined.

At 404, method 400 judges whether or not entry conditions for diagnosing operation of a particulate matter sensor are met. In one example, the entry conditions may be that the vehicle has traveled a predetermined distance. In another example, the entry conditions may be that a change in the output of the particulate matter sensor has not been detected. For example, the conductivity of the particulate matter sensor has not responded to detecting the presence of water in the exhaust system after and engine start. Thus, if the output of the particulate matter sensor is at a low level since engine stop and the engine is operating, the method may proceed to 406. Otherwise, if the output of the particulate sensor has indicated the presence of water, it may not make sense to inject liquid to the exhaust system so method 400 proceeds to 408. In another example, method 400 may require that a temperature of the exhaust system is above a freezing temperature of a liquid that may be injected to the exhaust system. For example, method 400 may require that the engine exhaust temperature be above a freezing temperature of water or urea before method 400 proceeds to 406. In still other examples, method 400 may require that the engine be stopped for a predetermined amount of time before allowing a diagnostic of the particulate matter sensor. Method 400 may also require a combination of the above conditions be met before proceeding to 406. If method 400 judges that entry conditions have been met, method 400 proceeds to 406. Otherwise, method 400 proceeds to 408.

It should be mentioned that the particulate matter sensor may undergo a diagnostic test each time the engine is operated. Alternatively, the particulate matter sensor may undergo a diagnostic test after a predetermined amount of time or after a predetermined number of engine operating hours, for example. Thus, entry conditions to method 400 may included these conditions as well.

At 408, method 400 adjusts the flow rate of $NH_3$ to the exhaust system in response to the estimated amount of $NH_3$ stored in the SCR and an amount of feed gas NOx produced by the engine. The feedgas NOx may be estimated via engine operating conditions or measured via a NOx sensor. If the estimated amount of $NH_3$ stored in the SCR is high, the flow rate of $NH_3$ may be reduced. If the estimated amount of $NH_3$ stored in the SCR is low, the flow rate of $NH_3$ may be increased. Further, in some examples, the engine feed gas NOx rate may be mapped to a $NH_3$ flow rate so as to provide $NH_3$ proportional to engine feed gas NOx. The flow rate of $NH_3$ at 408 is reduced as compared to the flow rate of $NH_3$ at 414 when the SCR is estimated to be storing the same amount of $NH_3$ at 408 and 414. Method 400 proceeds to exit after the $NH_3$ flow rate is adjusted.

At 406, method 400 judges whether or not the exhaust system temperature is below a dewpoint temperature by a threshold amount. In one example, the threshold amount may be based on a minimum amount of time that it takes to inject a liquid and observe a change in the output of the particulate sensor. For example, if the dewpoint temperature is 18° C., the exhaust system temperature is at 17° C., and it is expected that the exhaust temperature will reach 18° C. within 10 seconds after engine start then method 400 will not proceed to 410 if it is expected to take 20 seconds for liquid to reach the particulate matter sensor after the liquid is injected to the exhaust system. Method 400 does not proceed to 410 under such conditions because it can be expected that the liquid may vaporize before reaching the particulate matter sensor. The threshold amount of temperature may be empirically determined and indexed according to exhaust system and engine operating conditions. If method 400 judges that the exhaust temperature is below the dewpoint temperature by more than the threshold amount, method 400 proceeds to 410. Otherwise, method 400 proceeds to 408.

At 410, method 400 judges whether or not the conductivity of the particulate matter sensor has increased in response to the injection of liquid into the exhaust system or due to water in the exhaust system. In one example, a voltage level passing through the particulate matter sensor may increase in response to liquid depositing on the particulate matter sensor. If method 400 judges no change in particulate matter conductivity or the change in conductivity is below a threshold level, method 400 proceeds to 412. Otherwise, method 400 proceeds to 422.

At 412, method 400 judges whether or not the exhaust temperature is above a dewpoint temperature or if an allotted time to perform a diagnostic test of the particulate matter sensor has expired. If method 400 judges that the allotted amount of time has expired or that the exhaust system temperature is above the dewpoint temperature, method 400 proceeds to 418. Otherwise, method 400 proceeds to 414.

At 418, method 400 sets the particulate matter status flag to a value of zero to indicate that operation of the particulate matter sensor is at least partially degraded. Since the output of the particulate sensor has not exhibited a high level of conductivity it may be determined that the particulate sensor has not responded to water or the injection of liquid into the exhaust system. Method 400 proceeds to 420 after the particulate matter sensor status flag is set to zero.

At 420, method 400 sets the particulate matter sensor test flag to a value of two to indicate that the particulate matter diagnostic test has been completed. Thus, the length of the diagnostic test may be determined by a timer or a dewpoint temperature in the exhaust system being reached. Method 400 proceeds to exit after setting the particulate matter sensor test flag to a value of two.

At 414, method 400 adjusts the rate of liquid flowing into the exhaust system. In this example, aqueous $NH_3$ (urea) is injected to the exhaust system as part of the particulate matter diagnostic test. The flow rate of the liquid may be determined according to a difference between a temperature of the exhaust and the dewpoint temperature. For example, if the exhaust temperature is near the dewpoint temperature the flow rate of liquid into the exhaust system can be increased so that the liquid has time to reach the particulate sensor before the dewpoint temperature is reached in the exhaust system. If the exhaust system temperature is far lower than the dewpoint temperature, the flow rate of liquid into the exhaust system can be decreased since there may be more time for the liquid to reach the particulate matter sensor. In other examples, the flow rate of liquid into the exhaust system may be based on the flow rate of exhaust through the exhaust system. In still other examples, the flow rate of $NH_3$ may also be adjusted in response to an estimated amount of $NH_3$ stored within the SCR or emissions device located in the exhaust stream. For example, if the amount of $NH_3$ stored within the SCR is high, the $NH_3$ flow rate may be reduced. If the amount of $NH_3$ stored within the SCR is low, the $NH_3$ flow rate may be increased. Method 400 proceeds to 416 after the flow rate of liquid into the exhaust system is adjusted.

At 416, method 400 starts injection of liquid into the exhaust system. In the present example, $NH_3$ is injected into the exhaust system. However, in other examples, water or another liquid may be injected to the exhaust system or delivered to the exhaust system via engine cylinders. Injection of $NH_3$ into the exhaust system is one way to increase the conductivity of a particulate matter sensor. When liquid $NH_3$ is deposited on the particulate matter sensor, the $NH_3$ provides a short circuit path between electrodes of the particulate matter sensor, thereby increasing the conductivity of the particulate matter sensor. Consequently, the change in conductivity of the particulate matter sensor can be used as an indication of particulate matter sensor operation. Method 400 returns to 410 after injection of liquid begins.

At 422, method 400 sets the particulate matter sensor status flag to a value of one to indicate that the particulate matter sensor has responded to the injection of liquid into the exhaust system. The particulate matter sensor status flag may also be set to a value of one when liquid has not been injected to the exhaust system, but where conductance of the particulate matter sensor has increased after an engine start in response to water condensing in the exhaust system. Method 400 proceeds to 424 after the particulate matter sensor status flag is set.

At 424, method 400 sets the particulate matter sensor test flag to a value of two to indicate that the particulate matter diagnostic test is complete. Thus, the particulate matter test flag may be set to indicate that the particulate matter diagnostic test is complete after the particulate matter sensor increases in conductivity. Method 400 proceeds to exit after the particulate matter test flag is set.

In this way, the method of FIG. 4 injects a liquid into and exhaust system to verify operation of a particulate matter sensor. As the engine warms, the liquid vaporizes and exits the tailpipe so that the particulate matter sensor outputs a signal indicative of particulate matter on the particulate matter sensor. When $NH_3$ is injected to the exhaust system, at least a portion of the $NH_3$ may be stored within a SCR located downstream of the injector for reducing NOx produced by the engine. Thus, the $NH_3$ provides two functions, first as a particulate matter sensor diagnostic fluid, second as a reductant for NOx.

Thus, the method of FIG. 4 provides for a method for diagnosing a particulate matter sensor, comprising: injecting a liquid into an exhaust system before a dewpoint temperature in the exhaust system is exceeded; and depositing at least some of the liquid on the particulate matter sensor. In this way, the injected liquid is part of a diagnostic to verify operation of the particulate matter sensor. In one example, the liquid is urea. The method also includes where the particulate matter sensor is positioned downstream of a urea injector according to a direction of exhaust flow. The method further includes where the particulate matter sensor is positioned downstream of a SCR, and where the SCR is positioned downstream of the urea injector. The method further comprises injecting the liquid at a flow rate depending on a temperature of the exhaust. The method includes where a flow rate of the injected liquid increases as the temperature of the exhaust approaches a dewpoint temperature. The method further comprises providing an indication of particulate matter sensor degradation in response to a conductance of the particulate filter less than a threshold amount during a period when the liquid is injected to the exhaust system.

The method of FIG. 4 also provides for a method for diagnosing a particulate matter sensor, comprising: preventing injection of a liquid into an exhaust system when a temperature of the exhaust system is below a first temperature and a second temperature; injecting a liquid into an exhaust system when the temperature of the exhaust system is greater than the first temperature and less than the second temperature; and depositing at least some of the liquid on the particulate matter sensor. In this way, the method reduces the possibility of the injected liquid freezing in the exhaust system. In one example, the liquid is urea. The method includes ceasing to inject the liquid when the temperature of the exhaust exceeds the second temperature, and where the second temperature is the dewpoint temperature. The method also includes where the exhaust system is coupled to a diesel engine. In one example, the method includes where a conductance of the particulate matter sensor changes in response to at least some of the liquid depositing on the particulate matter sensor. The method includes where a condition of degradation of the particulate matter sensor is indicated when a conductance of the particulate matter sensor changes by less than a threshold amount. The method also includes where the particulate matter sensor is positioned downstream of a urea injector according to a direction of exhaust flow.

The method of FIG. 4 also provides for a method for diagnosing a particulate matter sensor, comprising: assessing degradation of a particulate matter sensor via a first liquid in an exhaust system of a vehicle after an engine start; and injecting a second liquid into an exhaust system when the particulate matter sensor fails to detect the first liquid; and depositing at least some of the second liquid on the particulate matter sensor. Thus, the method of FIG. 4 can first look for water vapor occurring naturally in the exhaust system (e.g., without specifically injecting or adding a liquid to the exhaust system) to condense before attempting to diagnose operation of a particulate matter sensor via injecting liquid to the exhaust system. In this way, the amount of liquid injected to the exhaust system may be reduced. The method includes where the first liquid is water and the second liquid is urea. The method also includes where the second liquid is injected to the exhaust system after a predetermined number of engine starts where the first liquid has not been detected. The method includes where the second liquid is injected to the exhaust system when a temperature of the exhaust system is less than a dewpoint temperature. The method also includes where a conductance of the particulate matter sensor changes in response to the first or second liquid. The method further includes where the particulate matter sensor is located downstream of a urea injector in the direction of exhaust flow.

As will be appreciated by one of ordinary skill in the art, the methods described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps, methods, or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for diagnosing a particulate matter sensor, comprising:
    injecting a liquid into an exhaust system before a dewpoint temperature in the exhaust system is exceeded;
    depositing at least some of the liquid on the particulate matter sensor; and
    indicating particulate matter sensor degradation responsive to particulate matter sensor conductance.

2. The method of claim 1, where the liquid is urea.

3. The method of claim 1, where the particulate matter sensor is positioned downstream of a urea injector according to a direction of exhaust flow.

4. The method of claim 3, where the particulate matter sensor is positioned downstream of a SCR, and where the SCR is positioned downstream of the urea injector.

5. The method of claim 1, further comprising injecting the liquid at a flow rate depending on a temperature of the exhaust system.

6. The method of claim 5, where flow rate increases as the temperature of the exhaust system approaches the dewpoint temperature.

7. The method of claim 1, further comprising providing an indication of particulate matter sensor degradation in response to a conductance of the particulate matter sensor less than a threshold amount during a period when the liquid is injected to the exhaust system.

8. A method for diagnosing a particulate matter sensor, comprising:
    preventing injection of a liquid into an exhaust system when a temperature of the exhaust system is below a first temperature and a second temperature;
    injecting a liquid into the exhaust system when the temperature of the exhaust system is greater than the first temperature and less than the second temperature;
    depositing at least some of the liquid on the particulate matter sensor; and
    indicating particulate matter sensor degradation responsive to particulate matter sensor conductance.

9. The method of claim 8, where the liquid is urea.

10. The method of claim 8, ceasing to inject the liquid when the temperature of the exhaust system exceeds the second temperature, and where the second temperature is a dewpoint temperature.

11. The method of claim 8, where the exhaust system is coupled to a diesel engine.

12. The method of claim 8, where a conductance of the particulate matter sensor changes in response to at least some of the liquid depositing on the particulate matter sensor.

13. The method of claim 8, where a condition of degradation of the particulate matter sensor is indicated when a conductance of the particulate matter sensor changes by less than a threshold amount.

14. The method of claim 8, where the particulate matter sensor is positioned downstream of a urea injector according to a direction of exhaust flow.

* * * * *